Aug. 15, 1939.    J. R. COONEY    2,169,405
PHOTOELECTRIC SYSTEM
Filed June 21, 1938
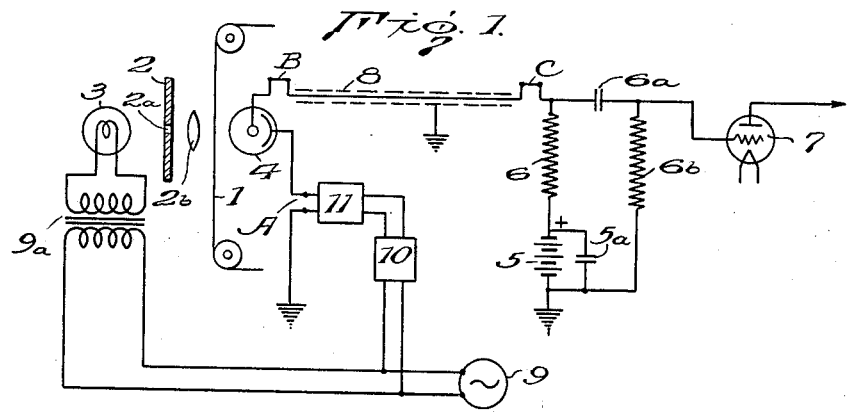
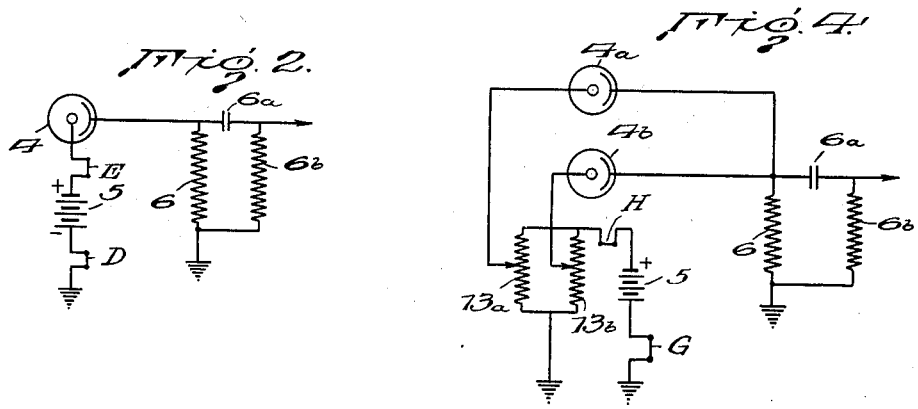
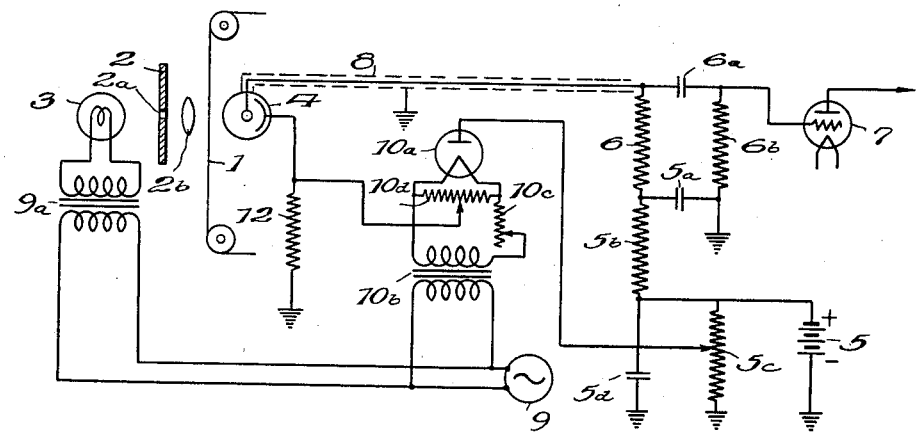
Inventor
John R. Cooney,
By Ralph B. Stewart
Attorney

Patented Aug. 15, 1939

2,169,405

UNITED STATES PATENT OFFICE

2,169,405

PHOTOELECTRIC SYSTEM

John R. Cooney, Waldoboro, Maine

Application June 21, 1938, Serial No. 215,068

8 Claims. (Cl. 250—41.5)

This invention relates to photo-electric systems and is particularly useful in sound reproducing systems of the type in which a beam of light is passed through a sound record to energize a photo-electric cell and thereby produce an electric current variable in accordance with the sound record. While my invention is particularly useful for reproduction of sound as in the case of reproducing sound from a motion picture film it is not limited to this use and may be applied in other fields.

It has heretofore been proposed to employ a lamp energized by alternating current as a light source in a photo-electric system. Such a source of light introduces disturbing variations in the output of the photo-electric cell due to the double frequency variation of the intensity of the light emitted from the lamp. It has also been proposed to balance out the disturbing variation by introducing into the grid circuit of the first amplifier tube connected to the photo-electric cell an alternating current of the same frequency and of opposite phase to the disturbing variation. In these prior systems, the amplitude of the neutralizing current applied to the amplifier remains constant, and these systems produce fairly satisfactory results when employed for the reproduction of sound from films or sound records in which the average density of the sound record over an appreciable area is constant. These systems, however, are not satisfactory for reproducing sound from the modern type of film in which the sound record is formed by the use of "noise reduction" circuits in which the amount of light admitted to the sensitive film during the recording process is varied in accordance with the degree of modulation or in accordance with the volume of the sound being recorded. In sound records of this type the average amount of light which is passed through the film varies in different sections of the film record in accordance with the volume of sound recorded. Thus, where the volume of the recorded sound is low, very little light will be passed by the film, whereas for large volumes considerable light will be passed. During times when no sound is being reproduced, the film is practically dark, whereas in the old type of sound film record, the amount of light passed at times of no reproduction is of the same average value as for either high volume or low volume.

An object of the present invention is to devise a system for neutralizing the disturbing effect of the light pulsations due to the alternating current and in which the amplitude of the neutralizing current is automatically varied in accordance with the variation of average intensity of the light falling upon the photo-electric cell.

My invention permits the use of an exciter lamp energized by alternating current, and secures the same high-fidelity reproduction as heretofore obtained with exciter lamps energized from a direct current source. Thus my invention reduces the cost of the equipment, which is especially desirable in small installations.

The principle of my invention may be explained in connection with the accompanying drawing in which:

Figure 1 is a schematic diagram illustrating the principal elements of a sound reproducing system embodying my invention;

Figure 2 is a fragmentary circuit diagram illustrating possible variations of the arrangements shown in Figure 1;

Figure 3 is a circuit diagram like Figure 1 showing the details of a specific arrangement for supplying the neutralizing current; and Figure 4 is a circuit diagram illustrating the invention applied to a system involving two photo-electric cells.

Referring to the drawing, a film 1 having a photographic sound record thereon is guided over suitable rollers past a plate 2 having a narrow slit 2a formed therein for admitting light from a lamp 3 to the film 1, a certain part of the light passing through the film 1 and falling upon the photo-electric cell 4. A lens or system of lenses indicated at 2b is employed to focus the rays passing through the slit 2a onto the film 1, preferably in such manner as to form a reduced image of the slit on the film. The photo-cell 4 is preferably of the gas-filled type ordinarily used in sound picture work. A source of biasing current indicated by the battery 5 is connected to the anode of the cell 4 through a coupling or output resistance 6, the cathode of the cell being grounded through a connection as shown, and the circuit through the cell being completed through the ground to the source 5. Potential variations developed across resistance 6 are transmitted to the grid of an amplifier tube 7 by means of a coupling condenser 6a and coupling resistance 6b. In accordance with usual practice, the anode lead from the cell 4 to coupling resistance 6 is preferably shielded by a grounded shield 8. Battery 5 is shunted with a by-pass condenser 5a. A suitable source of alternating current represented at 9 energizes the exciter lamp 3, preferably through a step-down transformer 9a. The neutralizing current of double frequency is derived from the source 9 by means of a frequency doubler 10 and is supplied to the connection between the cathode of the cell 4 and the ground at the point A through a suitable phase adjusting device 11. The frequency doubler 10 may be of any well known construction and may involve an arrangement for adjustment of the amplitude of the neutralizing voltage. The phase adjusting device 11 may also be of any known construction and may involve an adjustment to vary the amplitude of the neutralizing voltage.

Operation of the arrangement shown in Figure 1 is as follows: So long as no sound is being reproduced, the film 1 is practically dark and substantially no light reaches the cell 4. Since the cell 4 is not energized, the cell will present an effective open circuit to the neutralizing voltage introduced in the cell circuit at the point A and no disturbing currents from the neutralizing source will be impressed upon the amplifier 7. As soon as light is passed through the film 1 onto the cell 4, the cell becomes energized, and the primary electrons emitted by the cathode of the cell establishes current flow in the cell circuit from source 5 through resistance 6. The neutralizing voltage introduced at the point A also tends to establish current in this circuit. The current flowing in the cell circuit is amplified by the "gas effect" involving the ionization of the gas and the secondary emission of electrons from the cathode due to bombardment by positive ions, as is well understood. The value of current established in the circuit will vary directly with the amount of light falling on the cell and also with the voltage impressed on the cell electrodes. The voltage of the source 5 should be roughly between 20 and 90 volts. The neutralizing voltage causes the net biasing voltage applied to the cell to rise and fall periodically and thereby causes periodic variation in the amplification of the cell, and the changes in amplification neutralize the disturbing effect of light pulsations from lamp 3. Thus, as the light from lamp 3 increases, the neutralizing voltage decreases, and the tendency of the cell current to increase by reason of the increase in light, is counteracted by the decrease in amplification of the cell. It is only necessary to adjust the value of the neutralizing voltage for one intensity of light falling upon the cell 4, and no further adjustment is required, it being understood that the neutralizing voltage introduced at point A must be of the same frequency as the disturbing variations, opposite in phase thereto, and of substantially the same wave form.

Figure 1 shows only a part of the sound reproducing circuit, only the first stage of amplification being shown, but it will be understood that as many stages of amplification may be used as desired, and a suitable loud speaker or sound reproducer connected to the output of the last amplifier.

Instead of inserting the neutralizing voltage at the point A in the connection grounding the cathode of the cell 4, it may be inserted at the point B in the anode lead to the cell, or it may be inserted at the point C at the other end of the shield 8. The important point is that the neutralizing voltage should be inserted in series with the cell 4 and in series with the biasing battery 5, so that variation of the neutralizing voltage causes variation of the biasing voltage impressed on cell 3. I prefer to insert the neutralizing voltage at the point A rather than at the points B or C.

In Figure 2 I have shown a variation in the photo-cell arrangement in which the battery 5 is included in the connection from the anode of the cell 4 to ground and the coupling resistance 6 is included in a connection from the cathode of the cell to ground. In this connection, the neutralizing current may be inserted either at point D or at point E. The operation of this arrangement will be substantially like that described above for Figure 1.

In Figure 3 I have shown a circuit diagram substantially like Figure 1, but embodying a specific arrangement for securing proper neutralizing voltage. Elements which are common to Figures 1 and 3 are indicated by like reference numerals. The battery 5 merely symbolizes a suitable source of direct current, and in actual practice this source would probably involve a rectifier connected to a source of alternating current.

The neutralizing current of double the frequency of the source 9 is derived from the source 9 by means of a two-element thermionic tube 10a having a filamentary cathode energized from a source 9 through a transformer 10b and a variable resistance 10c, the anode of the tube 10a being connected to the variable tap on resistance 5c connected across the direct current source 5. The cathode of the photo-cell 4 is grounded through a resistance 12, and is also connected to a variable tap on resistance 10d connected across the cathode circuit of tube 10a. Current for cell 4 is supplied from source 5 through resistance elements 5b and 6 connected in series, and a condenser 5d is shunted across the source 5 and resistance 5c as shown. Preferably the filament of tube 10a is operated far below temperature saturation.

Since the cathode of tube 10a is energized from source 9, the electron emission of the cathode will vary at double the frequency of the source 9, and, accordingly, the space current flowing through the tube 10a will very cyclically at double the frequency of the source 9. The circuit for the space current flowing through tube 10a from source 5 includes resistance 12, and the double frequency current flowing through tube 10a produces a voltage drop across resistance 12 which is in proper phase relation for neutralizing the double frequency variation in intensity of light source 3. The value of neutralizing voltage developed across resistance 12 may be adjusted by varying resistance 10c or by adjusting the variable contact on resistance 5c, or by changing the value of resistance 12. It will be understood that a separate source of current may be employed for supplying the space current through tube 10a if desired.

In Figure 4, I have shown a circuit connection in which two photo-cells 4a and 4b may be employed and operated from a single biasing source 5. The biasing potential applied to the cells 4a and 4b may be separately adjusted by varying the contacts on resistance elements 13a and 13b. The neutralizing voltage may be connected in series with source 5 either at the point G or at the point H. The operation of the arrangement shown in Figure 4 will be readily understood from the foregoing description of operation of the remaining figures. The arrangement of Figure 4 is useful when two or more projectors are to be operated from a common source of biasing or space current. This arrangement is also useful in equipment having two photo-cells connected in push-pull relation.

In the arrangement shown in Figure 3 the neutralizing voltage may be introduced in the space current circuit of the photo-cell by a transformer inserted between resistance 12 and tube 10a to prevent the steady component of the space current of tube 10a from flowing through resistance 12. Transformers may also be used for the same purpose in the circuits of the other figures.

It will be understood that my invention is not limited to systems in which the cell circuit is coupled to the amplifier circuit by resistance coupling but is equally applicable to system employing other types of coupling, such as transformer coupling.

What I claim is:

1. In combination, a source of light of variable intensity, a photo-cell energized by light from said source, a source of biasing current for said cell, a voltage source variable in intensity in accordance with variations of said light source, and a circuit including said cell, said voltage source and said biasing current source all connected in serial circuit relation, said voltage source having proper phase and amplitude to neutralize the variations in photo-electric current due to variations in said light source.

2. In combination, a photo-electric cell, a source of light of variable intensity for exciting said cell, a space current circuit for said cell, and a source of variable voltage connected in series with the space current circuit of said cell for neutralizing the space current variations caused by the variation in intensity of said light source.

3. In combination, a photographic sound record having a variable average density, a photo-electric cell, a source of light for exciting said cell through said sound record, said light source being subject to periodic variations in intensity, a space current circuit for said cell, and a source of periodic voltage connected in series with said space current circuit for neutralizing the variations in space current in said circuit due to the variations in intensity of said light source.

4. In combination, a photo-electric cell, a source of light of variable intensity for exciting said cell, a space current circuit for said cell including an impedance element and a source of direct current, an amplifier having its input circuit connected across said impedance element, and a source of periodic voltage connected in series with the space current circuit, the periodic changes in said voltage source having proper phase and amplitude to neutralize the variations in photo-electric current due to variations in said light source.

5. In combination, a photo-electric cell, a lamp for exciting said cell, a source of alternating current for energizing said lamp, a space current circuit for said cell including a source of direct current, means for deriving from said source of alternating current a voltage of double the frequency of said source and of opposite phase to the space current variations produced by variations in light intensity of said lamp, and connections for applying said double-frequency voltage in series with the space current circuit of said cell.

6. In combination, a photo-electric cell, a lamp for exciting said cell, a source of alternating current for energizing said lamp, a space current circuit for said cell including a source of direct current and an impedance element, a thermionic device having an electron emitting cathode and an anode, a circuit for energizing said cathode from said source of alternating current, a space current circuit for said thermionic device including a source of direct current and said impedance element whereby a voltage of double the frequency of said source of alternating current is developed across said impedance element for neutralizing variations in space current of said cell due to the variations in intensity of said lamp.

7. In combination, a photo-electric cell of the gas-filled type, a source of light of variable intensity for exciting said cell, a space current circuit for said cell, and a source of variable voltage connected in series with the space current circuit of said cell for producing variable ionization of the gas of said cell, the variations in said voltage source being adjusted in phase and amplitude to effect neutralization of space current variations caused by the variation in intensity of said light source.

8. In combination, a photo-electric cell of the gas-filled type, a lamp for exciting said cell, a source of alternating current for energizing said lamp, a space current circuit for said cell including a source of direct current of sufficient voltage to ionize the gas of said cell, means for deriving from said source of alternating current a voltage of double the frequency of said source and of opposite phase to the space current variations produced by variations in light intensity of said lamp, and connections for applying said double-frequency voltage in series with the space current circuit of said cell, whereby said double-frequency voltage varies the ionization of the gas of said cell in opposite phase to the variations in light from said lamp.

JOHN R. COONEY.